L. WERNICKE.
TRAP.
APPLICATION FILED MAY 10, 1919.
1,322,664.
Patented Nov. 25, 1919.
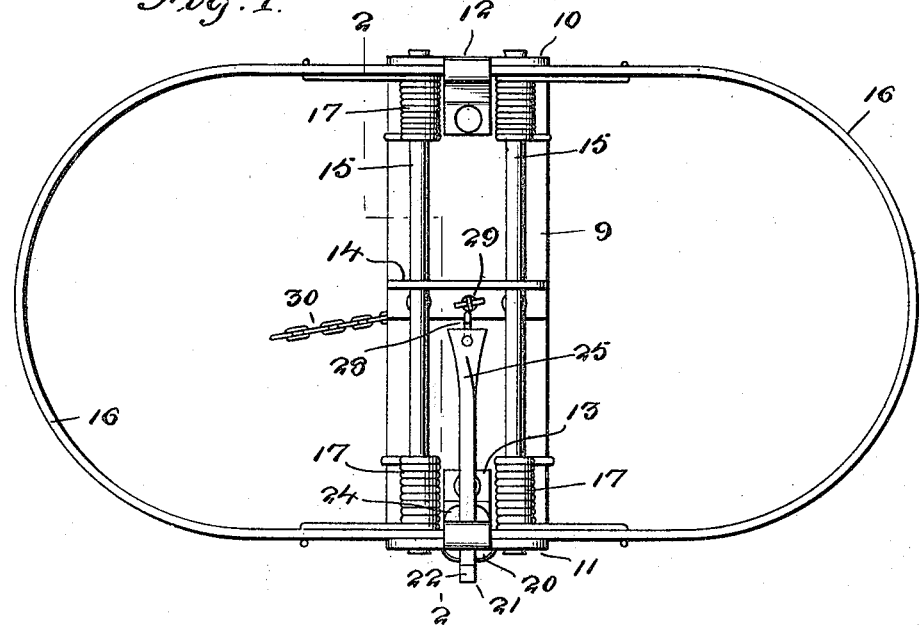
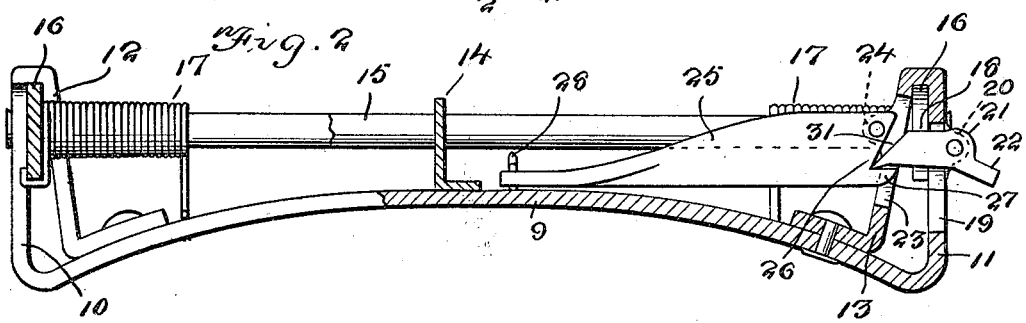
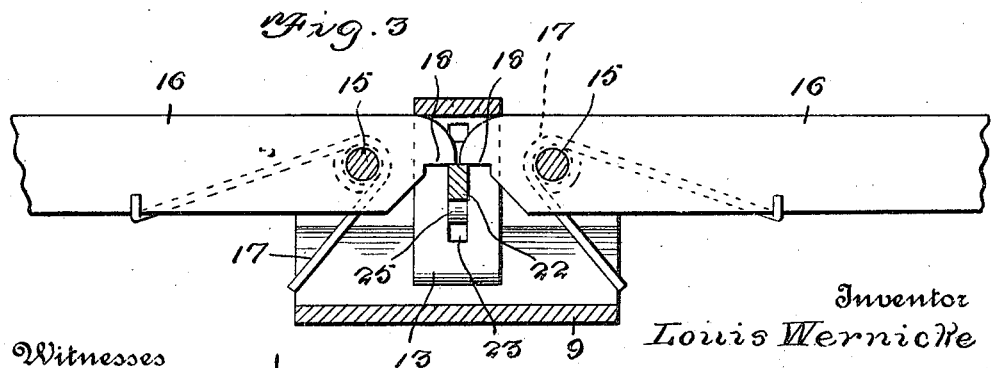
Inventor
Louis Wernicke
Witnesses
By Victor J. Evans
Attorney

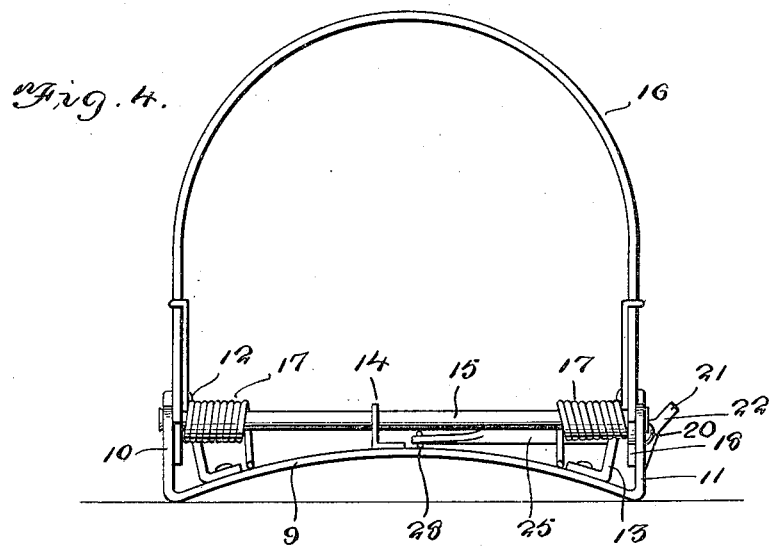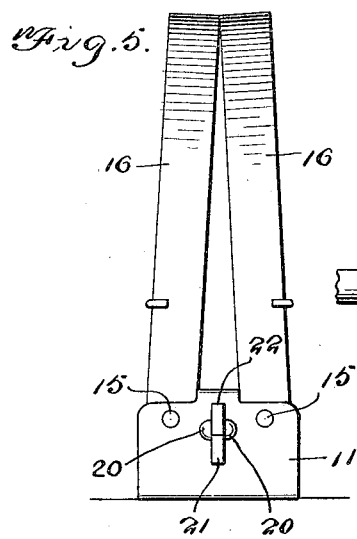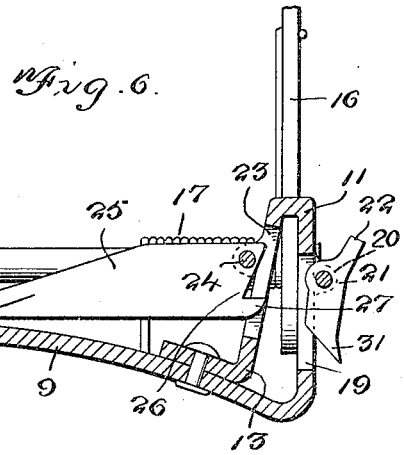

ered Nov. 25, 1919.
UNITED STATES PATENT OFFICE.

LOUIS WERNICKE, OF WEST BEND, WISCONSIN.

TRAP.

1,322,664.   Specification of Letters Patent.   Patented Nov. 25, 1919.

Application filed May 10, 1919. Serial No. 296,107.

*To all whom it may concern:*

Be it known that I, LOUIS WERNICKE, residing at West Bend, in the county of Washington and State of Wisconsin, have invented new and useful Improvements in Traps, of which the following is a specification.

This invention relates to traps, particularly to those of the spring jaw type, and has for its object the provision of a trap including a pair of spring pressed jaws adapted to be brought into engagement with the neck of an animal attempting to remove the bait from the trap, the bait being carried by a trigger member so arranged that an upward pull upon the trigger member is required to release the jaws in contradistinction to the ordinary form of trap employing a treadle operated trigger which must be stepped upon by an animal to effect a release of the jaws.

An important object is the provision of a trap of this character which will be more humane in its action by catching an animal by its neck instead of by the leg, as is done in the ordinary trap.

A further object is the provision of a trap of this character in which the trigger is set by means of a catch projecting entirely beyond one side of the trap so as to avoid the necessity of the operator placing his hands within the confines of the trap, the device being therefore far more safe to use than the ordinary form of trap.

An additional object is the provision of a trap of this character in which the attaching chain, by means of which it is anchored, is secured centrally upon the underside of the trap so that a direct pull will be obtained when an animal seizes the bait and attempts to make off with the same.

Another object is the provision of a trap of this character which will be simple and of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings, in which—

Figure 1 is a plan view of the trap in set position,

Fig. 2 is a cross sectional view therethrough on the line 2—2 of Fig. 1,

Fig. 3 is a cross sectional view on the line 3—3 of Fig. 1,

Fig. 4 is a side elevation showing the trap sprung,

Fig. 5 is an elevation taken at right angles to Fig. 4,

Fig. 6 is a longitudinal sectional view showing the parts in released position.

Referring more particularly to the drawings, the numeral 9 designates a base plate which is preferably longitudinally arcuate, as shown, and which is provided at its ends with upstanding flanges 10 and 11. Secured upon the base 9 and engaging upon the top of the flange 10 is a brace 12, and secured upon the base 9 at the other end and connected with the flange 11, is a bracket 13. Secured centrally upon base 9 in transverse relation thereto, is a bracket 14 which is provided with spaced holes through which extend a pair of spaced parallel rods 15 which have their ends extending through the flanges 10 and 11.

Journaled upon the end portions of the rod 15 at the inner faces 10 and 11 are substantially semicircular jaws 16 which may have their meeting edges smooth or serrated, as preferred. The end portions of the jaws are provided with holes engaged upon the rods 15 whereby the pivotal connection is obtained. It will be seen that the end portions of the jaws are disposed upon opposite sides of the brace 12 and bracket, respectively. Disposed upon the rods 15 adjacent their ends, are coil springs 17, each of which has one arm engaged with the adjacent edge of the base 9 and its other arm engaged with the outer edge of the adjacent jaw 16, the function of these springs being to urge the jaws together. The size of the jaws and the strength of the springs depend entirely upon the size of the animal which it is intended to engage.

Adjacent the bracket 13 the end portions of the jaws 16 are cut away to provide tongues 18 and the length of these tongues is such that when the jaws are moved to open position, that is extending in the same plane, the ends of the tongue will not contact with each other. At substantially its center, the flange 11 is provided with an opening 19 at the sides of which are formed ears 20 between which is pivotally mounted a catch member 21 adapted to be disposed beneath the tongues 18 and this catch member is provided with a finger engaging portion 22 whereby the catch member may be moved. The opening 19 is provided so that the catch member 21 may extend through the flange 11 and beneath the tongues 18.

The bracket 13 is provided with an opening 23 substantially registering with the opening 19 in the flange 11 and at the sides of the opening 23 are provided ears 24 between which is pivoted a trigger bar 25 which is provided adjacent its pivot point with a cut out portion 26 providing a projection 27 engageable by the active end of the catch member 21 for holding the jaws in open or set position. At its other end, the trigger bar 25 is provided with some suitable hook 28 upon which the bait, such as a chunk of meat, may be engaged.

In order that the trap may be anchored, a hole 29 is provided at the center of the plate or base 9 and this hole also extends through the central bracket 14. Engaged within this hole in any suitable manner, is a chain 30 which may be secured to a stake or the like.

The operation of the device is as follows:—

The trap being in inactive or sprung position, as shown in Figs. 4, 5 and 6, in order to set the trap, the bait is first secured upon the hook 28. In order to set the trap it is necessary that the operator grasp the jaws 16, pulling them apart and forcing them downwardly as far as possible until they both lie in the same plane. The jaws may be held in this position by the feet of the operator, if desired. At this time the weight of the trigger bar 25 and the bait thereon will hold the free end of the trigger bar down in engagement with the base plate 9, and the weight of the finger engaging portion of the catch member 21 will hold the catch member with its beveled engaging end 31 disposed against the end of the projection 27 formed beneath the cut out portion 26 at the pivoted end of the trigger bar 25. The operator then places his finger upon the finger engaging portion of the catch member 21 and presses downwardly whereupon the engagement of the beveled active end 31 of the catch member with the projection 27 will cause the trigger bar 27 to be swung upwardly slightly until the beveled end 31 passes beyond the projection 27 whereupon the weight of the trigger bar will return it to its initial position with the beveled end 31 of the catch member disposed within the cut out portion 26 of the trigger bar. It will be seen that the catch member 21 is then disposed beneath the tongues 18 on the ends of the jaws and the tension of the springs 17 tending to pull the jaws 16 together, will hold the catch member 21 forcibly against the top of the projection 27. The trap is then set and will remain set until an animal seizes the bait carried by the trigger bar and pulls upwardly upon the trigger bar. The resultant upward swinging movement of the trigger bar will cause the projection 27 thereon to be swung from beneath the active end of the catch member whereupon there will be no stop beneath the tongues 18 and the force of the springs 17 will then cause the jaws to snap together, engaging the neck of the animal.

From the foregoing description and a study of the drawings it will be apparent that I have thus provided a simply constructed and very easily set trap which will be humane in its action in engaging an animal by its neck and consequently instantly killing it, which is incapable of being sprung by being stepped upon and will therefore not be dangerous in use.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A trap comprising a base plate, a pair of curved jaws pivoted at their ends with respect to said base plate, the ends of the jaws at one end of the base plate being cut away to provide tongues, a catch member pivoted at said end of said base plate and disposable beneath said tongues, and a trigger bar pivoted at said end of said plate and adapted to carry bait at its free end and having its pivoted end provided with a cut out portion adapted to receive said catch member.

2. A trap comprising a base plate having its ends provided with upstanding flanges, a pair of curved jaws pivoted upon said flanges and having their ends at one of said flanges provided with tongues, springs urging said jaws together, a pivoted catch member provided with a finger engaging portion and having one end disposable beneath said tongues, and a pivoted bait carrying trigger bar normally engaging said catch member for holding said jaws in open position, upward movement of said trigger bar resulting in disengagement thereof from said catch member and consequent movement of said jaws together.

3. A trap comprising a base plate provided at its ends with upstanding flanges, a bracket secured at one end of said base plate and connected with the adjacent flange, a pair of spring pressed jaws pivoted at their ends upon said flanges, the ends of said jaws adjacent said bracket being cut to provide tongues, said flange adjacent said bracket being provided with an opening, a pivoted catch member extending through said opening and having an active end engageable beneath said tongues, a finger engaging portion formed on said catch member, said bracket being provided with an opening, a pivoted trigger bar extending through said last named opening and adapted to carry bait at its free end, and the pivoted end of said trigger bar being provided with a cut out portion adapted to receive the active end of said catch member.

4. A trap comprising a base plate provided at its ends with upstanding flanges, a bracket secured at one end of said base plate and connected with the adjacent flange, a pair of spring pressed jaws pivoted at their ends upon said flanges, the ends of said jaws adjacent said bracket being cut to provide tongues, said flange adjacent said bracket being provided with an opening, a pivoted catch member extending through said opening and having an active end engageable beneath said tongues, a finger engaging portion formed on said catch member, said bracket being provided with an opening, a pivoted trigger bar extending through said last named opening and adapted to carry bait at its free end, and the pivoted end of said trigger bar being provided with a cut out portion adapted to receive the active end of said catch member, the cut out portion in said trigger bar defining a projection at the lower edge thereof and the active end of said catch member being beveled and engaging said projection whereby upon downward movement of the finger engaging portion of said catch member resulting in engagement of said beveled end with said projection will cause upward swinging of said trigger bar to permit entry of the active end of said catch member within the cut out portion of said trigger bar.

In testimony whereof I affix my signature.

LOUIS WERNICKE.